United States Patent
Youlian et al.

(10) Patent No.: US 7,952,826 B2
(45) Date of Patent: May 31, 2011

(54) METHOD OPERATING HARD DISK DRIVE ON THE BASIS OF PREDICTED DEFECT USING HIERARCHICAL CLUSTERING AND CURVE FIT

(75) Inventors: Hristov Stoev Youlian, Seoul (KR); Jin-won Choi, Suwon-si (KR); Nam-guk Kim, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 304 days.

(21) Appl. No.: 12/143,938

(22) Filed: Jun. 23, 2008

(65) Prior Publication Data

US 2009/0153997 A1 Jun. 18, 2009

(30) Foreign Application Priority Data

Jun. 21, 2007 (KR) .......................... 10-2007-0061119

(51) Int. Cl.
*G11B 5/09* (2006.01)
*G11B 27/36* (2006.01)
(52) U.S. Cl. ................................ 360/53; 360/31; 360/48
(58) Field of Classification Search .................... None
See application file for complete search history.

(56) References Cited

U.S. PATENT DOCUMENTS

| | | | |
|---|---|---|---|
| 6,246,717 B1 * | 6/2001 | Chen et al. ............... | 375/226 |
| 6,876,445 B2 | 4/2005 | Shibuya et al. | |
| 7,120,832 B2 * | 10/2006 | Collins et al. ........... | 714/42 |
| 7,139,145 B1 | 11/2006 | Archibald et al. | |
| 7,143,442 B2 * | 11/2006 | Scarfe et al. ............. | 726/23 |
| 2002/0191319 A1 | 12/2002 | Liew et al. | |

FOREIGN PATENT DOCUMENTS

| JP | 2004171755 | 6/2004 |
|---|---|---|
| JP | 2005018948 | 1/2005 |

* cited by examiner

*Primary Examiner* — Daniell L Negrón
*Assistant Examiner* — Regina N Holder
(74) *Attorney, Agent, or Firm* — Volentine & Whitt, PLLC

(57) ABSTRACT

A method of operating a hard disk drive (HDD) on the basis of a predicted new defect in a disk associated with the HDD is disclosed. The method includes detecting defects in a magnetic surface of the disk, defining a plurality of clusters by grouping the detected defects using a hierarchical clustering algorithm, calculating a curve fit for each one of the plurality of clusters, predicting a new defect likely to occur in the magnetic surface of the disk on the basis of the calculated curve fit; and writing data to the disk on the basis of the new defect prediction.

19 Claims, 7 Drawing Sheets

METHOD OPERATING HARD DISK DRIVE ON THE BASIS OF PREDICTED DEFECT USING HIERARCHICAL CLUSTERING AND CURVE FIT

CROSS-REFERENCE TO RELATED APPLICATION

This application claims priority under 35 U.S.C. §119 to Korean Patent Application No. 10-2007-0061119 filed on Jun. 21, 2007, the subject matter of which is hereby incorporated by reference.

BACKGROUND OF THE INVENTION

1. Field of the Invention

The present invention relates generally to hard disk drives (HDDs) and methods controlling the operation of HDDs. More particularly, the invention relates to a method of predicting and managing recording medium defects in an HDD using an approach that includes hierarchical clustering and curve fit.

2. Description of the Related Art

Documents related to the present invention include U.S. Pat. No. 7,139,145 describing a cluster-based defect detection method used during the testing for HDDs; U.S. Pat. No. 6,985,319 describing a pattern-based defect identification method; and U.S. Pat. No. 7,072,129 further describing the identification of recording medium defects (i.e., as related to data sectors in a disk drive). The collective subject matter of these documents is hereby incorporated by reference. Additionally, Japanese Patent Publication No. 1995-334933 describes a method of determining the location of a scratch on a recording medium.

A HDD is one type of data storage device allowing read data to be retrieved from a disk, and write data to be recorded on the disk using one or more magnetic heads. As the data storage capacity and the data recording density of HDDs increases, and the physical size and weight of HDDs decrease, the data bit per inch (BPI) characteristic related to the data storage density in a disk rotation direction, as well as the data track per inch (TPI) characteristics related to the data storage density in a radius direction necessarily increase.

As is well understood by those skilled in the art, all practical recording media, including the magnetic surface of disks within HDDs, include defect regions in which data may not be properly recorded and/or retrieved. Hereafter, regardless of the specific type of recording media and nature (or cause) of the data storage/retrieval incapacity, such regions will be referred to as "defects". A defect usually occurs when there is physical damage, such as a scratch, to the upper surface of a disk. Such physical damage causes a data storage/retrieval loss of at least a data byte, which is a standard unit for reading and writing data. Such defects generally cause a reduction in the overall data storage capacity of a HDD.

Accordingly, defects must be detected and accounted for (i.e., by address replacement or physical substitution, etc.) during the manufacturing process of a HDD in order to guarantee acceptable operation of the HDD in consumer use. Generally speaking, searching for (i.e., detecting) and moving to (i.e., following) a substituted normal data region for an identified defect during the read/write processes executed in a HDD is referred to as the defect management process.

Environmental changes, such as variation in temperature, humidity, and operating voltage, may cause a scratch to extend from an initially damaged region of a disk into adjacent regions. Thus, a defect area in the surface of a disk may actually increase with operation of the HDD. Accordingly, even if all "initial" defects are effectively detected and properly accounted for in a defect management process following manufacture of the HDD, "new" defects (i.e., defects arising after final manufacturing tests) may occur in relation to an existing scratch.

Unfortunately, conventional methods of detecting and/or managing defects are limited to only the initial defects, and are ill-suited to effectively deal with new defects that routinely occur proximate an initial scratch, for example.

SUMMARY OF THE INVENTION

The present invention provides a method of predicting and managing defects in a hard disk drive (HDD) which increases the overall reliability of the HDD by predicting and managing all defects.

In one embodiment, the invention provides a method of operating a hard disk drive (HDD) on the basis of a predicted new defect in a disk associated with the HDD, the method comprising; detecting defects in a magnetic surface of the disk, defining a plurality of clusters by grouping the detected defects using a hierarchical clustering algorithm, calculating a curve fit for each one of the plurality of clusters, predicting a new defect likely to occur in the magnetic surface of the disk on the basis of the calculated curve fit, and writing data to the disk on the basis of the new defect prediction.

In another embodiment, the invention provides a computer readable recording medium recording a program operating in relation to a hard disk drive (HDD), the program implementing a method of operating the HDD on the basis of a predicted new defect in a disk associated with the HDD, the method comprising; detecting defects in a magnetic surface of the disk, defining a plurality of clusters by grouping the detected defects using a hierarchical clustering algorithm, calculating a curve fit for each one of the plurality of clusters, predicting a new defect likely to occur in the magnetic surface of the disk on the basis of the calculated curve fit, and writing data to the disk on the basis of the new defect prediction.

In another embodiment, the invention provides a method of operating a hard disk drive (HDD) on the basis of a predicted new defect in a disk associated with the HDD, the method comprising; detecting defects in a magnetic surface of the disk, defining a plurality of clusters by grouping the detected defects using a hierarchical clustering algorithm, calculating a curve fit for each one of the plurality of clusters, predicting a new defect likely to occur in the magnetic surface of the disk on the basis of the calculated curve fit, registering the predicted new defect in a defect map, and writing data to the disk on the basis of the defect map.

DESCRIPTION OF EMBODIMENTS

The present invention will now be described in some additional detail with reference to the attached drawings. However, the invention may be variously embodied and should not be construed as being limited to only the illustrated embodiments. Rather, the illustrated embodiments are presented as teaching examples.

Figure 1:
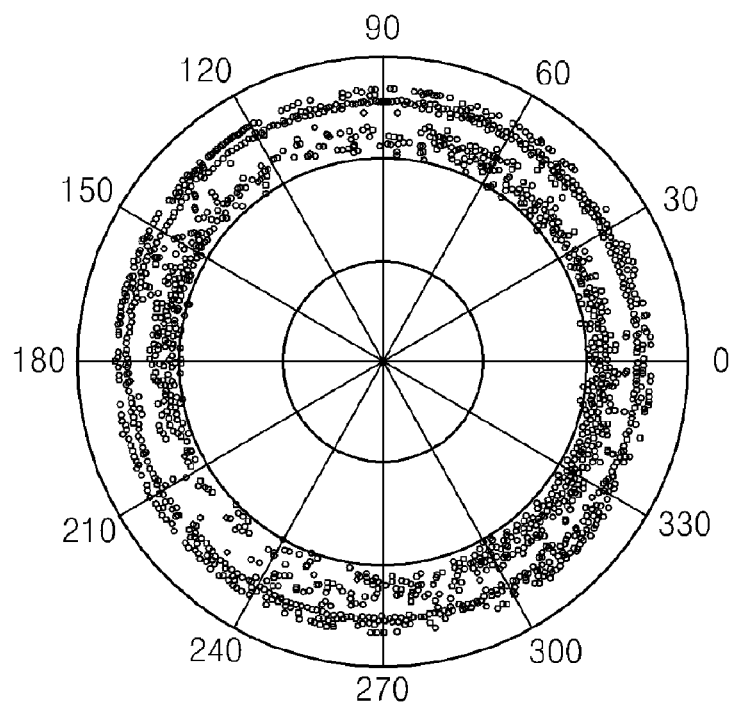
FIG. 1 is a diagram illustrating the occurrence of defects on a disk in polar coordinates.

FIG. 1 is a diagram expressed in polar coordinates and illustrating defects occurring on a disk.

The great majority of the defects shown in FIG. 1 are due to scratches formed in the magnetic upper surface of the disk. In general, a scratch may be generated in a sector direction, a track direction, or an inclination direction. However, scratches are most commonly generated in the track direction. Further, most scratches are mostly formed in a straight line and often extend in a longitudinal direction. Scratch characterization data may be readily gathered by analyzing a defect list.

Figure 2:
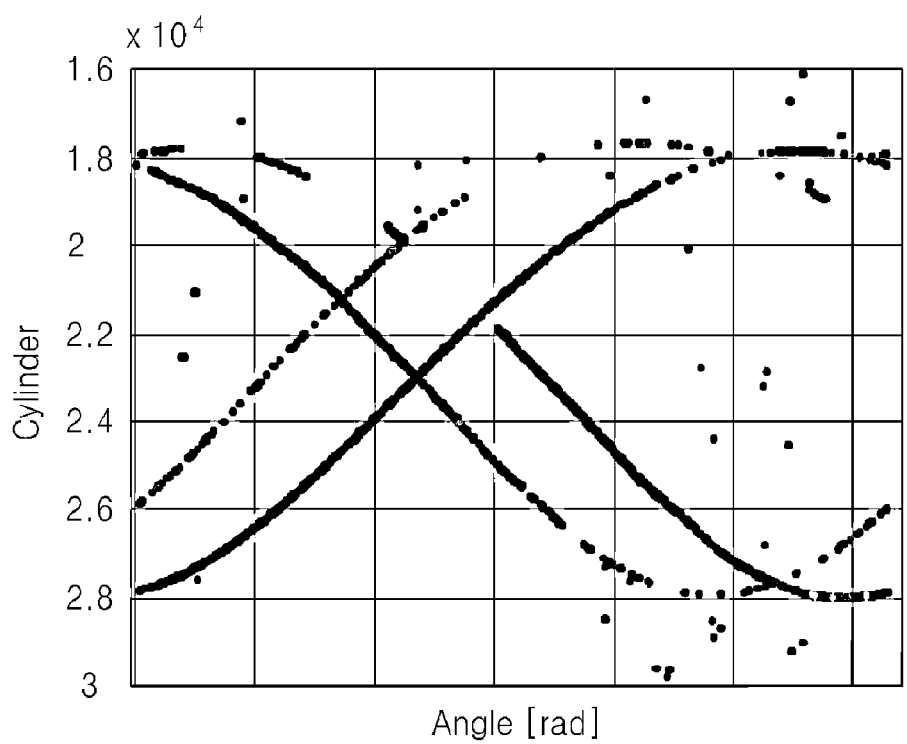
FIG. 2 is a diagram further illustrating the occurrence of defects shown in FIG. 1 in Cartesian coordinates.

FIG. 2 is a diagram further illustrating the defects of FIG. 1 in Cartesian coordinates.

Referring to FIG. 2, it can be seen that the location of the defects on the disk are closely correlated. A trigonometric function curve may often be used to denote a collection of defects associated with a scratch. That is, a pattern analysis routine may be performed to identify respective defects in relation to a particular scratch. This type of pattern analysis may be designed according to a number of well understood mathematical principals, but will hereafter be referred to generally as "hierarchical clustering."

Figure 3:
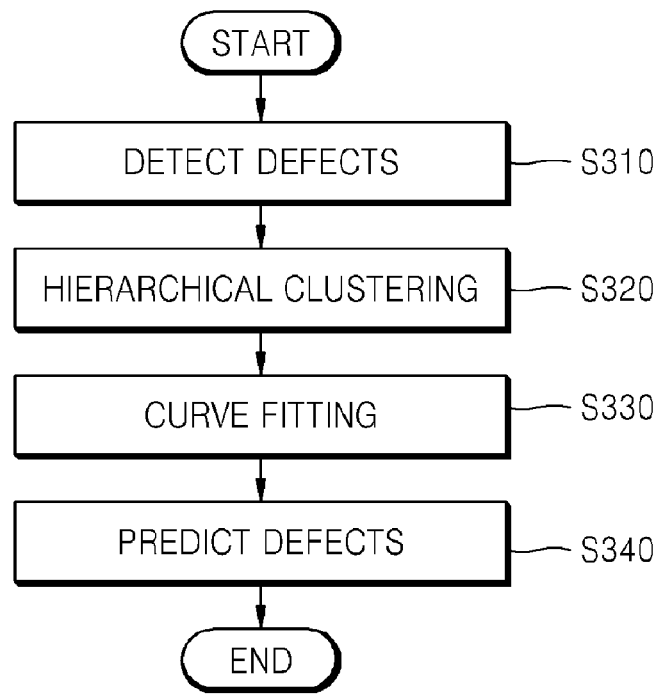
FIG. 3 is a flowchart of a method of predicting a defect in the recording medium of a HDD according to an embodiment of the invention.

FIG. 3 is a flowchart summarizing a method of predicting defects in a HDD according to an embodiment of the invention.

In operation S310, defects occurring in the surface of a disk are detected using conventional techniques. Most typically, defect information is obtained by scanning the disk. The defect information obtained by scanning the disk may be expressed in terms of cylinder location, sector location, and a head location. Detected defects include both servo defects and data defects. Servo defects may be detected during a servo write process and data defects may be detected during a burn-in test process. Once obtained, the defect information is registered in a defect list stored in a constituent memory.

In operation S320, a plurality of clusters is formed by grouping detected defects using one or more of a number of conventionally understood hierarchical clustering algorithms. In various specific implementations, hierarchical clustering is a multivariate statistical analysis that allocates a defect to a specific group of defects based on a correlation factor determined between each defect item and a group of defects. A group of defects is referred to as a cluster. Hierarchical clustering algorithms may be generally divided into bottom-up and top-down approaches. In one embodiment of the invention, a bottom-up hierarchical clustering algorithm is used, as is discussed in some additional detail hereafter.

Conventionally understood hierarchical clustering algorithms include single linkage methods, complete linkage methods, group average linkage methods, the so-called Ward method, etc. In the illustrated embodiment of the invention that follows, a single linkage clustering method will be described. However, when a particular cluster is well divided into a plurality of identifiable sub-clusters, a complete linkage clustering method may be used with good effect within certain embodiments of the invention.

In operation S330, a trigonometric (or other mathematical) curve is fitted to each cluster. Curve fitting is a well understood mathematical technique, but generally speaking, curve fitting is a process of looking for a polynomial that most suitably expresses the correlation characteristics of a discrete data set. Such discrete data sets are commonly derived from experimental data or numerical analysis results and are typically discontinuous values. The polynomial that most accurately expresses the correlation characteristics of the data set is referred to as a curve fit, and a process of looking for the curve fit is referred to as a curve fitting. A specific curve fitting approach will result from the operational (i.e., available processing time) and hardware considerations brought to bear on the problem. In one embodiment of the invention, the curve fit may be a quadric polynomial. Curve fit may be calculated in certain embodiments of the invention using a least square method.

In operation S340, "new" defects that may occur during future use of the HDD are predicted on the basis of the calculated curve fit. In this regard, the curve fit may be seen as a defect vector expressing both the size and direction of the scratch. A sector (i.e., a portion of the disk surface that exists within a defined range of an identified scratch) may develop a new defect. Such new defects may be predicted using a confidence interval calculated on the basis of the previously determined curve fit. In other words, certain disk sectors existing within the confidence interval of a defined curve fit may be identified as possible disk regions in which new defects are likely to occur.

Figure 4:
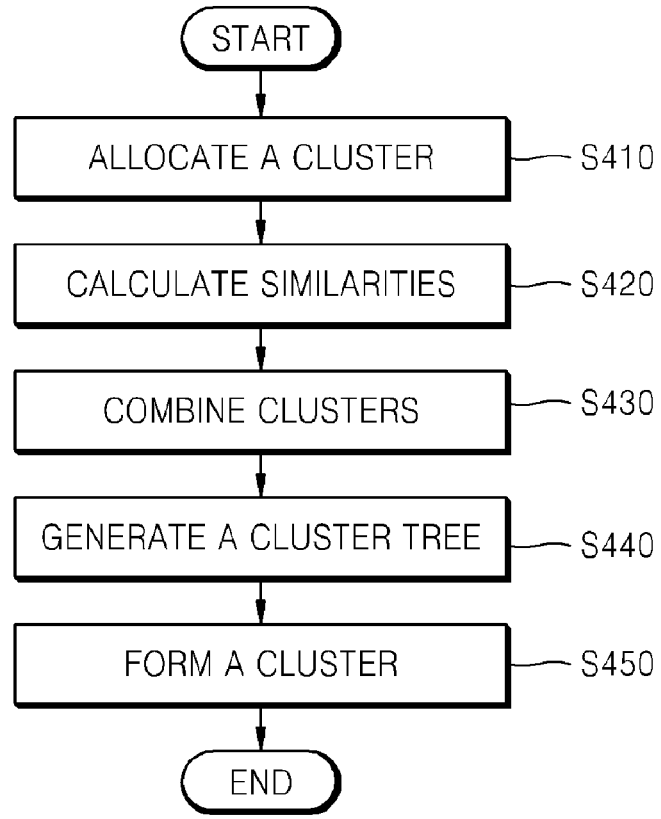
FIG. 4 is a flowchart further describing the hierarchical clustering step of the method illustrated in FIG. 3.

FIG. 4 is a flowchart further summarizing the step of hierarchical clustering described in relation to FIG. 3.

In operation S410, a cluster is identified (or "allocated") in relation to each defect. Accordingly, where N defects have been detected on the surface of a disk, N clusters are generated. In operation S420, similarities between all generated clusters are determined. Such similarities may be calculated using a Euclidean distance, for example. Several methods of calculating Euclidean distance are well known to those skilled in the art, and therefore, details of this technique are omitted from this description. It should be noted, however, that operation S420 is the most time consuming portion of the overall hierarchical clustering method.

In operation S430, the clusters are combined according to the calculated similarities. The cluster combination process may be performed in stages. Accordingly, when a first combination process is performed, N−1 clusters remain from the original N generated clusters. The combination process is repeated until only a single large cluster remains. In other words, a calculation of similarity between each newly generated cluster and the remaining clusters is repeatedly performed until only a single large cluster is identified.

When the combination process is completed, a cluster tree is generated in operation S440. The cluster tree is an index showing similarity between each defect. That is, if the determined similarity between defects is great, the defects may be faithfully presumed to be related to the same source (i.e., a scratch). In operation S450, a final cluster is formed by selecting a branch of the cluster tree having a Euclidean distance equal to or below a defined threshold value. That is, each branch existing in a distance equal to or below the threshold value is designated (or formed) into a final cluster.

Figure 5:
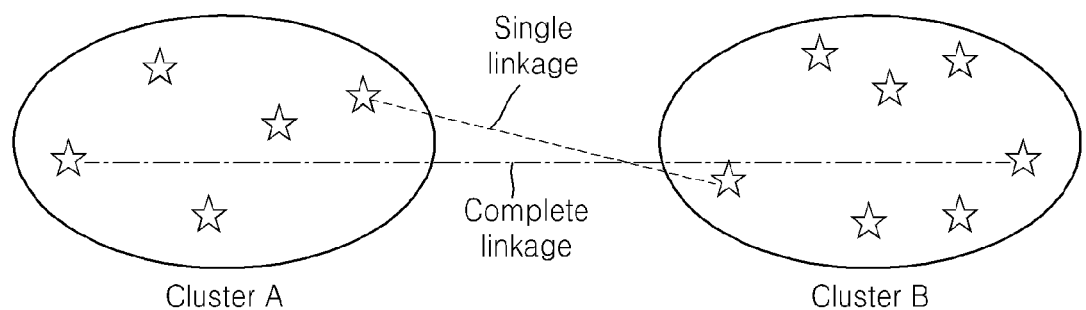
FIG. 5 is a conceptual diagram describing a single linkage clustering and a complete linkage clustering.

FIG. 5 is a diagram describing a single linkage clustering and a complete linkage clustering.

A single linkage clustering uses a similarity of defects having the largest similarity in two clusters as a similarity of a cluster pair that is to be combined, and the complete linkage clustering uses a similarity of defects having the smallest similarity in two clusters as a similarity of a cluster pair that is to be combined.

In FIG. 5, two clusters are combined via a single linkage or a complete linkage. Cluster A includes 5 defects and Cluster B includes 7 defects. Here, each star denotes a defect. As described above, a similarity between two clusters are determined according to a Euclidean distance. Referring to FIG. 5, the single linkage clustering and the complete linkage clustering can be easily understood.

Figure 6:
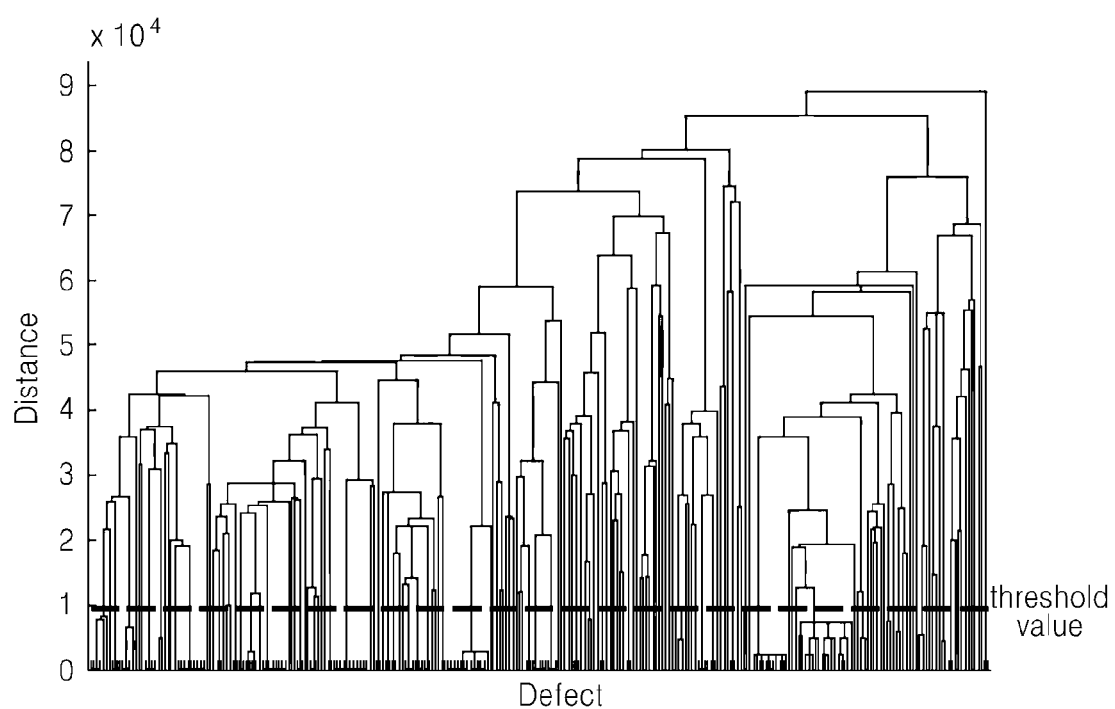
FIG. 6 is a dendrogram describing hierarchical clustering in some additional detail.

FIG. 6 is a dendrogram further describing the hierarchical clustering process.

Referring to FIG. 6, it may be seen that clusters are gradually and sequentially combed to one final cluster based on their Euclidean distance. Here, a branch on the upper right is generated by the final combination process. As described above, a hierarchical clustering ultimately generates one cluster by allocating one cluster to each defect and repeating the combination process in stages. A dendrogram is a diagram commonly used to show such clustering results.

The cluster ultimately generated is divided into a plurality of clusters based on the defined threshold value. This threshold value is a standard for determining same scratch association. Thus, as noted above, each branch of the cluster tree equal to or below a defined threshold value is determined to be associated with a scratch. In one embodiment of the invention, a threshold value corresponds to 10,000×a track distance.

Figure 7:
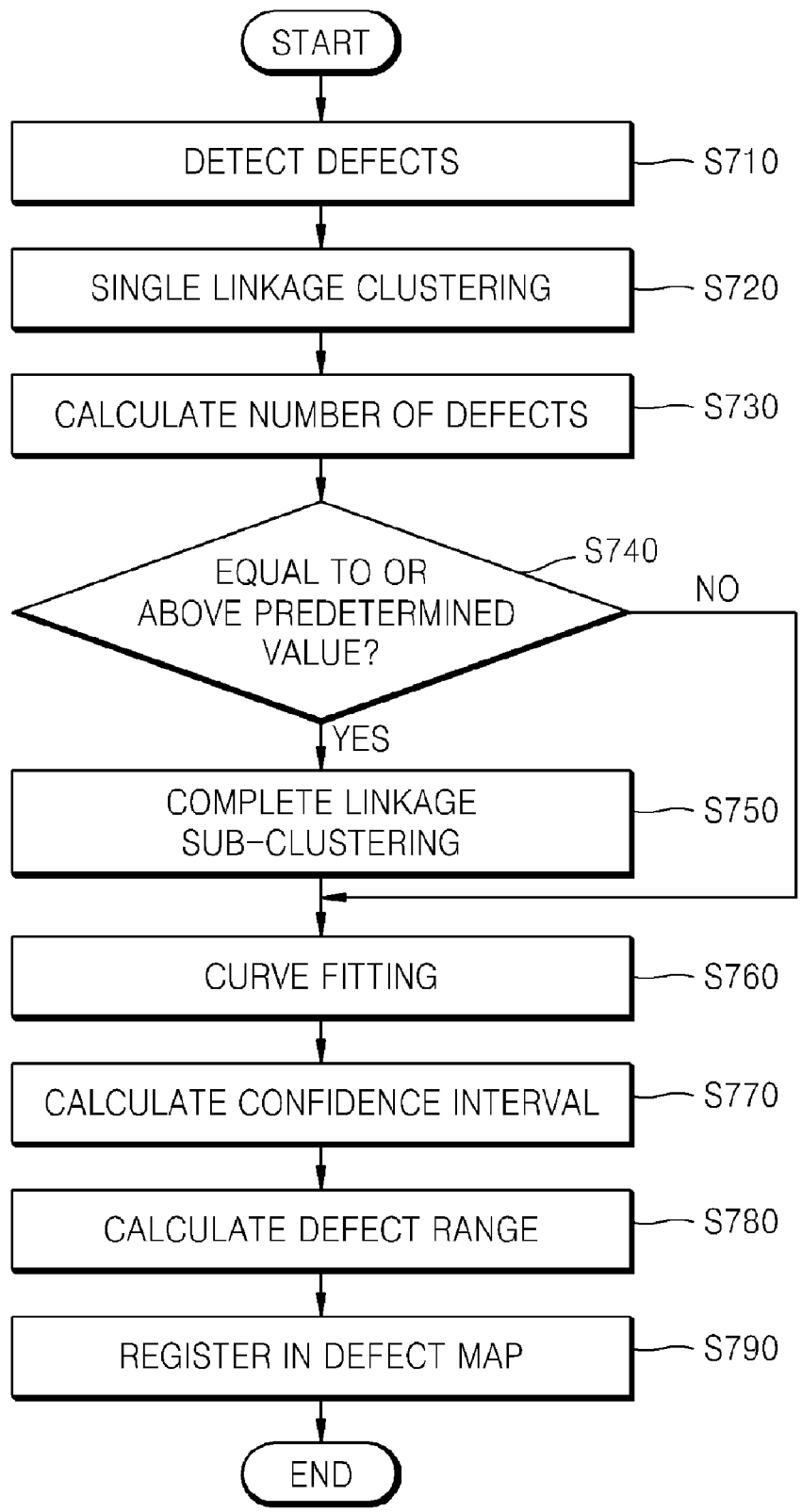
FIG. 7 is a flowchart of a method of managing defects in a HDD according to an embodiment of the invention.

FIG. 7 is a flowchart summarizing a method of managing defects in a HDD according to an embodiment of the invention.

In operation S710, defects existing on the surface of a disk are detected. That is, defect information is obtained by scanning the disk. In operation S720, a plurality of clusters is formed by grouping the detected defects using a single linkage clustering. The number of clusters formed in operation S720 corresponds to the number of scratches existing on the surface of the disk. In other words, one cluster denotes one scratch. In operation S730, the number of defects included in each cluster is calculated.

In operation S740, it is determined whether the number of defects included in each cluster is equal to or above a predetermined value. It is inefficient to perform the curve fitting described above on a cluster including 500 or more defects due to overflow. Accordingly, when a cluster includes too many defects, the cluster should be divided into a plurality of sub-clusters.

When the number of defects included in a cluster is equal to or above the predetermined value, the cluster is divided into a plurality of sub-clusters using a complete linkage sub-clustering in operation S750. Each sub-cluster may include approximately 80 to 120 defects. Even when one cluster is divided into the plurality of sub-clusters, the curve fit for each sub-cluster is almost the same, and thus precision is not reduced.

In operation S760, a curve fit for each cluster or sub-cluster is calculated. The curve fit is calculated using a least square method. Considering operational speed and available resources, the curve fit may be a quadric polynomial. The curve fit shows an optimum approximation curve and may include an error. However, using the least square method, an approximation curve which can minimize an error can be calculated.

In operation S770, a confidence interval is calculated based on the calculated curve fit. The confidence interval shows a neighboring or surrounding area of the curve fit, and a sector inside the confidence interval is an area that can develop into a defect in the future. The confidence interval may be 95% or 99%. In operation S780, a defect range is estimated based on the confidence interval.

In operation S790, sectors inside the defect range are registered on a defect map. The defect map exists in a maintenance cylinder of the disk. Upon registering the sectors in the defect map, the defects are managed. The defects can be managed using a re-allocation method or a slip method. The re-allocation method and the slip method are well known in the related art and thus details thereof are omitted herein.

Figure 8:
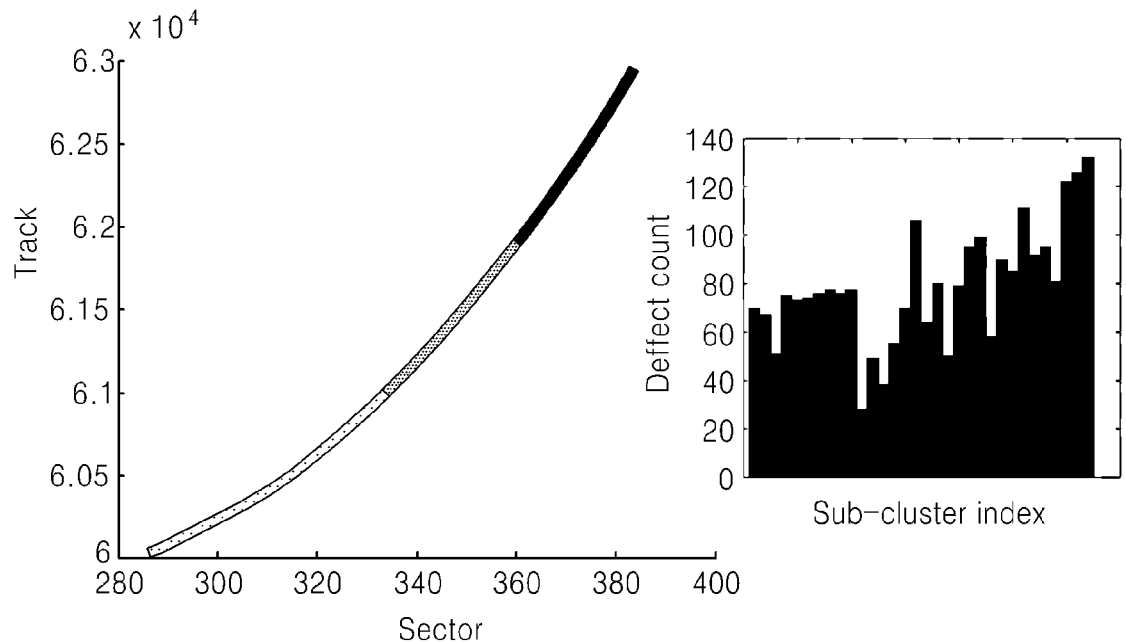
FIG. 8 is a set of related diagrams further illustrating the length and size of a sub-cluster.

FIG. 8 shows related diagrams illustrating the length and size of a sub-cluster.

In FIG. 8, a left drawing illustrates a scratch formed of a plurality of sub-clusters and a right drawing illustrates the number of defects included in each sub-cluster. In the left drawing, each sub-cluster is shown in different shapes of solid lines or broken lines. Referring to FIG. 8, each sub-cluster is continuous and one cluster is divided into sub-clusters including 20 to 130 defects. Here, the number of defects included in each sub-cluster may be 80 to 120.

Figure 9:
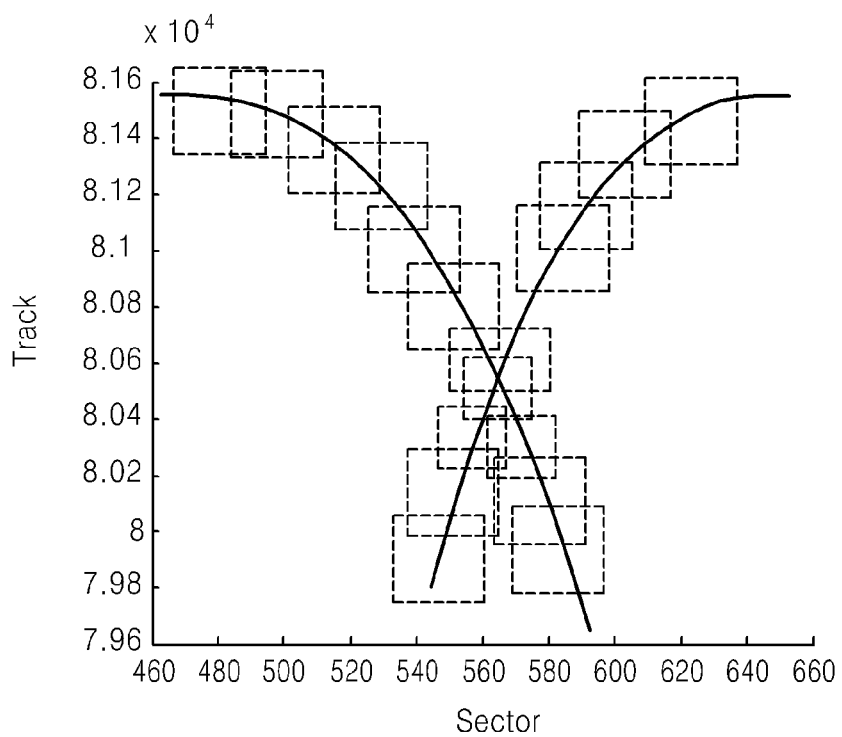
FIG. 9 is a diagram illustrating the occurrence of scratches that cross one another on the surface of a disk.

FIG. 9 is a diagram illustrating two scratches that cross each other on the surface of a disk.

Referring to FIG. 9, it can be seen that interpreting of the scratches via sub-clusters is efficient when two scratches cross each other. If each cluster is not divided into a plurality of sub-clusters despite that the two scratches cross each other, the two scratches can be interpreted as one big scratch because a Euclidean distance between defects around a crossing is very close. Also, this may cause a problem while performing a curve fitting later. However, such problems can be solved via a sub-clustering.

Figure 10:
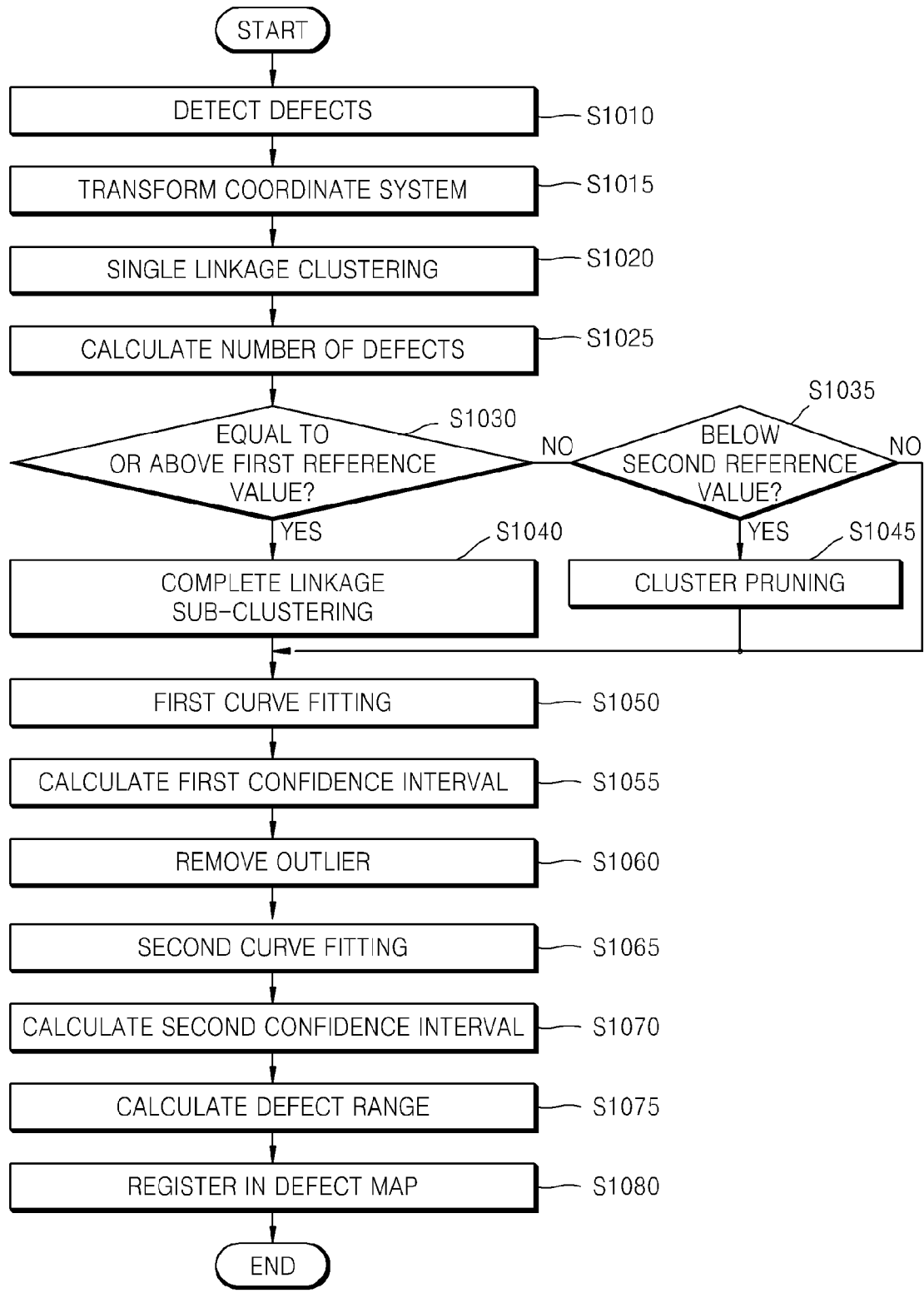
FIG. 10 is a flowchart of a method managing defects in a HDD according to another embodiment of the invention.

FIG. 10 is a flowchart summarizing a method of managing defect in a HDD according to another embodiment of the invention.

In operation S1010, defects on the surface of a disk are detected. In other words, defect information is obtained by scanning the disk. As described above, the defect information includes information about a cylinder location, a sector location, and a head location. Meanwhile, the defect information is stored in a cylinder/sector format of the disk. However, since the size of a sector changes according to the location of a cylinder in which the defects belong, a scaling difference occurs according to the location of the cylinder while calculating a curve fit. Accordingly, coordinates showing the locations of defects are transformed from polar coordinates to Cartesian coordinates in operation S1015 considering the scaling difference according to the locations of each cylinder.

In operation S1020, a plurality of clusters is formed by grouping the detected defects using a single linkage clustering. The number of clusters formed in operation S1020 corresponds to the number of scratches on the surface of the disk. In other words, one cluster denotes one scratch. In operation S1025, the number of defects included in each cluster is calculated.

In operation S1030, it is determined whether the calculated number of defects is equal to or above a first reference value. It is inefficient to apply the curve fitting described above on a cluster including 500 or more defects due to an overflow. Accordingly, when a cluster includes too many defects, the cluster should be divided into a plurality of sub-clusters. Accordingly, in operation S1040, each cluster is divided into a plurality of sub-clusters using a complete linkage clustering.

In operation S1035, it is determined whether the calculated number of defects is below a second reference value. It is inefficient to apply the curve fitting described above to a cluster including defects below 4 due to reliability. Accordingly, when a cluster includes too less defects, it is preferable to omit the process of calculating a curve fit of the cluster. Accordingly, a cluster pruning is performed in operation S1045.

In operation S1050, a first curve fit of each cluster or sub-cluster is calculated. The first curve fit may be calculated using a least square method, and considering an operation speed, the first curve fit may be a quadric polynomial. The first curve fit shows a suitable approximation curve, but its accuracy may deteriorate due to an outlier. Accordingly, the outlier should be removed.

A first confidence interval is calculated based on the first curve fit. Here, the first confidence interval may be 95% or 99%. Processes of calculating a curve fit based on discrete data and calculating a confidence interval based on the calculated curve fit are well known to one of ordinary skill in the art, and thus details thereof are omitted herein. In operation S1060, an outlier is removed using the calculated first confidence interval. In other words, defects not existing in the first confidence interval are removed in order to increase reliability of the curve fit.

In operation S1065, a second curve fit of the cluster formed of defects without the outlier is calculated. The second curve fit is an approximation in which accuracy is improved compared to the first curve fit. In operation S1070, a second confidence interval is calculated based on the calculated second curve fit. The second confidence interval may be 95% or 99%. In operation S1075, a defect range is calculated based on the calculated second confidence interval.

In operation S1080, sectors inside the defect range are registered in a defect map. The sectors include bad sectors, which can be developed into defects in the future. The defect map exists in a maintenance cylinder. After registering the bad sectors in the defect map, the defects are managed. The defects may be managed using a re-allocation method or a slip method.

Figure 11:
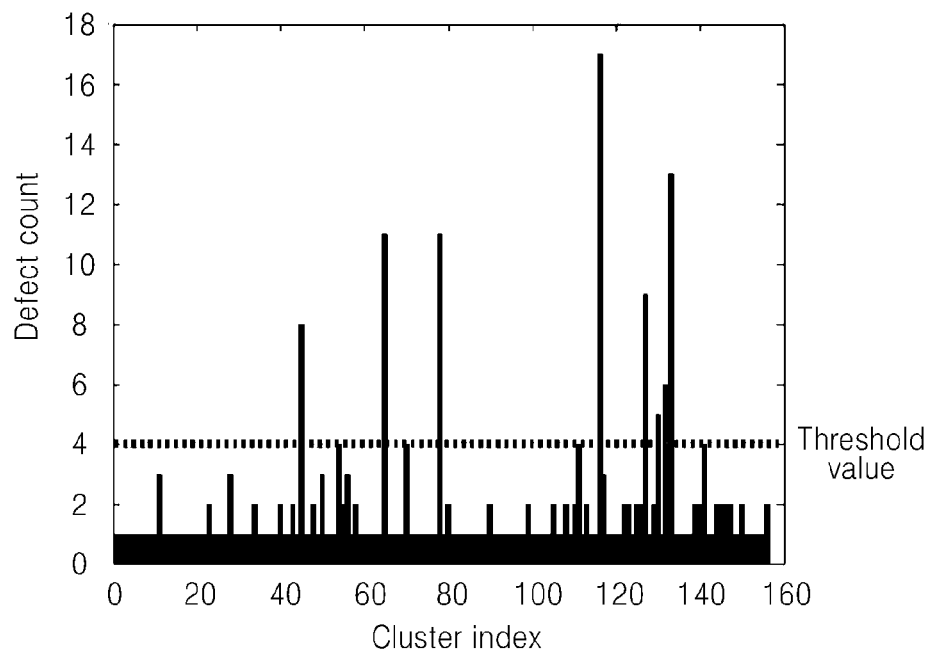
FIG. 11 is a diagram illustrating cluster pruning according to the number of defects included in a cluster.

FIG. 11 is a diagram illustrating cluster pruning according to the number of defects included in a cluster.

Referring to FIG. 11, it can be seen that each cluster includes different number of defects. Here, the cluster includes sub-clusters. When the number of defects included in a certain cluster is too small, reliability on the cluster deteriorates. Accordingly, a cluster having low reliability should be selected and removed. Such process is called a cluster pruning.

Figure 12:
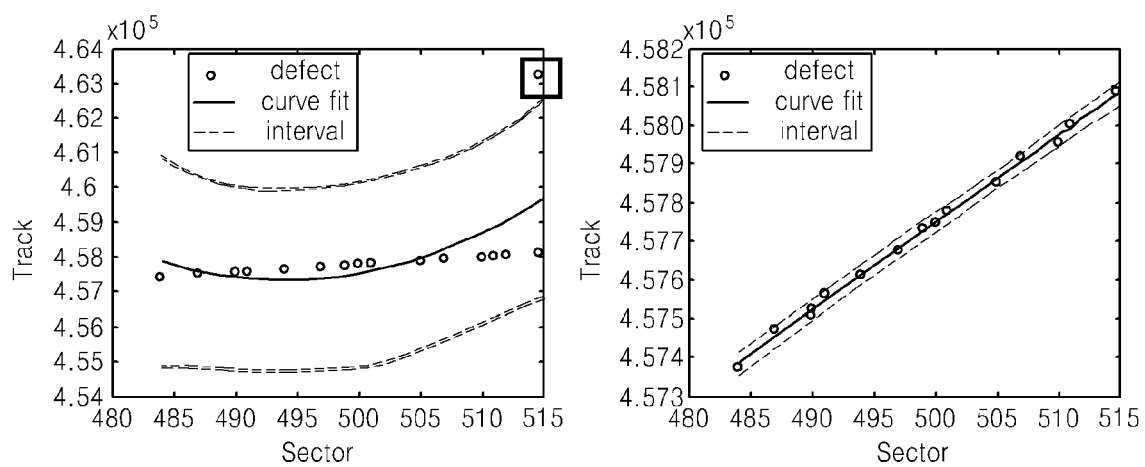
FIG. 12 is related diagrams describing the detection and removal of an outlier.

FIG. 12 shows related diagrams describing the detection and removal of an outlier.

A left drawing of FIG. 12 illustrates a curve fitting before removing an outlier and a right drawing of FIG. 12 illustrates a curve fitting after removing an outlier. Referring to the left drawing, it can be seen that the curve fitting is not suitably performed due to an outlier. However, referring to the right drawing, it can be seen that the curve fitting is suitably performed because an outlier is removed.

The present invention can be implemented as a method, an apparatus, and a system. When the present invention is implemented in software, its component elements are code segments that execute necessary operations. Programs or code segments can be stored in computer readable recording media and may be further transmitted via a computer data signal that is combined with a carrier wave in a transmission medium or in a communication network. A computer readable recording medium may take many different forms. Examples of the computer readable recording medium include electronic circuits, semiconductor memory devices, ROMs, flash memories, erasable ROMs (EROMs), floppy disks, optical disks, hard disks. A computer data signal can be any signal capable of being transmitted via transmission media, such as electronic network channels, optical fiber, air, an electronic field, RF networks, etc.

According to the method of predicting and managing defects in a HDD, not only initial defects may be managed, but also new defects occurring as the result of a scratch may be predicted and managed following the manufacture of the HDD. Accordingly, reliability of the HDD can be improved.

In this context, those of ordinary skill in the art will understand that a HDD may be operated (i.e., data may be written to or read from the HDD) in relation to the a defect management scheme that takes into account new defects predicted on the basis of the defect information derived above. Clearly, it is preferable to avoid writing (or attempting to write) data to regions of disk more likely to suffer from new defects arising from existing scratches.

While the present invention has been particularly shown and described with reference to exemplary embodiments thereof, it will be understood by those of ordinary skill in the art that various changes in form and details may be made therein without departing from the scope of the invention as defined by the following claims.

What is claimed is:

1. A method of operating a hard disk drive (HDD) on the basis of a predicted new defect in a disk associated with the HDD, the method comprising:
   detecting defects in a magnetic surface of the disk;
   defining a plurality of clusters by grouping the detected defects using a hierarchical clustering algorithm;
   calculating a curve fit for each one of the plurality of clusters;
   predicting a new defect likely to occur in the magnetic surface of the disk on the basis of the calculated curve fit; and
   writing data to the disk on the basis of the new defect prediction.

2. The method of claim 1, wherein defining the plurality of clusters comprises:
   calculating a Euclidean distance between the detected defects;
   generating a hierarchical cluster tree based on the calculated Euclidean distance; and
   defining the clusters by selecting clusters having a distance equal to or below a threshold value from among the hierarchical cluster tree.

3. The method of claim 2, wherein defining the clusters is performed using a single linkage clustering algorithm.

4. The method of claim 2, wherein the threshold value corresponds to 10,000×a track distance associated with the disk.

5. The method of claim 1, wherein defining the plurality of clusters comprises:
   calculating a number of defects for each one of the plurality of clusters;
   determining whether the calculated number of defects for each one of the plurality of clusters is equal to or above a predetermined value; and when a calculated number of defects for one of the plurality of clusters is equal to or above the predetermined value, dividing the one cluster into a plurality of sub-clusters.

6. The method of claim 5, wherein dividing the one cluster is performed using a complete linkage clustering algorithm.

7. The method of claim 5, wherein the predetermined value is 500.

8. The method of claim 5, wherein calculating the curve fit is performed in relation to each one of the plurality of sub-clusters.

9. The method of claim 5, wherein calculating the curve fit is not applied to a cluster or a sub-cluster comprising fewer than four (4) defects.

10. The method of claim 1, wherein defining the plurality of clusters is performed using a Cartesian coordinate system.

11. The method of claim 1, wherein calculating the curve fit comprises:
   calculating a first curve fit of each one of the plurality of clusters;
   calculating a confidence interval based on the calculated first curve fit;
   detecting and removing an outlier deviating from the confidence interval; and
   calculating a second curve fit after removal of the outlier.

12. The method of claim 11, wherein the curve fit is a quadric polynomial.

13. The method of claim 11, wherein the confidence interval is 95% or 99%.

14. The method of claim 1, wherein calculating the curve fit is performed using a least square method.

15. The method of claim 1, wherein detecting defects in a magnetic surface of the disk, defining a plurality of clusters by grouping the detected defects using a hierarchical clustering algorithm, calculating a curve fit for each one of the plurality of clusters, and predicting a new defect likely to occur in the magnetic surface of the disk on the basis of the calculated curve fit are performed during burn-in testing of the HDD.

16. A method of operating a hard disk drive (HDD) on the basis of a predicted new defect in a disk associated with the HDD, the method comprising:
   detecting defects in a magnetic surface of the disk;
   defining a plurality of clusters by grouping the detected defects using a hierarchical clustering algorithm;
   calculating a curve fit for each one of the plurality of clusters;
   predicting a new defect likely to occur in the magnetic surface of the disk on the basis of the calculated curve fit;
   registering the predicted new defect in a defect map; and
   writing data to the disk on the basis of the defect map.

17. The method of claim 16, wherein defining the plurality of clusters comprises:
   calculating a Euclidean distance between the detected defects;
   generating a hierarchical cluster tree based on the calculated Euclidean distance; and
   defining the clusters by selecting clusters having a distance equal to or below a threshold value from among the hierarchical cluster tree.

18. The method of claim 16, wherein defining the plurality of clusters comprises:
   calculating a number of defects for each one of the plurality of clusters;
   determining whether the calculated number of defects for each one of the plurality of clusters is equal to or above a predetermined value; and
   when a calculated number of defects for one of the plurality of clusters is equal to or above the predetermined value, dividing the one cluster into a plurality of sub-clusters.

19. The method of claim 16, wherein calculating the curve fit comprises:
   calculating a first curve fit of each one of the plurality of clusters;
   calculating a confidence interval based on the calculated first curve fit;
   detecting and removing an outlier deviating from the confidence interval; and
   calculating a second curve fit after removal of the outlier.

* * * * *